(12) United States Patent
Wu

(10) Patent No.: US 8,170,406 B2
(45) Date of Patent: May 1, 2012

(54) AUTOMOTIVE WATER HEATER

(76) Inventor: Chia-Hsiung Wu, Taipei (TW)

( * ) Notice: Subject to any disclaimer, the term of this patent is extended or adjusted under 35 U.S.C. 154(b) by 380 days.

(21) Appl. No.: 12/496,144

(22) Filed: Jul. 1, 2009

(65) Prior Publication Data

US 2009/0263114 A1    Oct. 22, 2009

Related U.S. Application Data

(63) Continuation-in-part of application No. 11/635,531, filed on Dec. 8, 2006, now abandoned.

(51) Int. Cl.
*A47J 31/00* (2006.01)
(52) U.S. Cl. .................. 392/465; 392/467; 392/478
(58) Field of Classification Search ........... 392/465–484
See application file for complete search history.

(56) References Cited

U.S. PATENT DOCUMENTS

| | | | |
|---|---|---|---|
| 941,215 A | 11/1909 | Wade | |
| 1,820,458 A | 8/1931 | Jenkins | |
| 1,978,690 A | 10/1934 | Peterson | |
| 3,782,456 A | 1/1974 | Gusmer | |
| 4,177,375 A | 12/1979 | Meixner | |
| 4,334,141 A | 6/1982 | Roller et al. | |
| 4,343,988 A | 8/1982 | Roller et al. | |
| 4,371,777 A | 2/1983 | Roller et al. | |
| 4,508,957 A | 4/1985 | Rocchitelli | |
| 4,687,907 A | 8/1987 | Barkley et al. | |
| 5,256,857 A | 10/1993 | Curhan et al. | |
| 5,947,722 A | 9/1999 | Bauer | |
| 6,014,498 A | 1/2000 | Ikeda et al. | |
| 6,330,395 B1 | 12/2001 | Wu | |
| 6,442,341 B1 | 8/2002 | Wu | |
| 6,816,670 B1 | 11/2004 | Renau | |
| 6,896,199 B2 | 5/2005 | Bissonnette | |
| 6,952,524 B2 | 10/2005 | Bissonnette et al. | |
| 6,957,013 B2 | 10/2005 | Zimmer | |
| 7,127,158 B1 | 10/2006 | Yen et al. | |

*Primary Examiner* — Thor Campbell

(74) *Attorney, Agent, or Firm* — Muncy, Geissler, Olds & Lowe, PLLC

(57) ABSTRACT

An automotive water heater having application to a windshield of an automobile, which is able to produce hot water that can be sprinkled on the windshield to melt accumulated snow and frost, in which a water heater is mainly structured from a laminated assembled heating unit side joined to a heat conducting surface of an exchange bed. Heat quantity produced by the heating unit forms a heat balance function, which transfers the heat to the exchange bed, and water flow paths are defined interior of the exchange bed. The face joining of the laminated heating units is used to facilitate maintenance of component members and allow changing of the number of heating units assembled to the exchange bed, thereby providing choice to accommodate different power requirements.

7 Claims, 7 Drawing Sheets

AUTOMOTIVE WATER HEATER

RELATED APPLICATION

This application is a Continuation-In-Part of currently pending U.S. patent application Ser. No. 11/635,531 filed on Dec. 8, 2006 now abandoned.

BACKGROUND OF THE INVENTION (a) Field of the Invention

The present invention relates to an automotive water heater, and more particularly to a water heater that has application to a windshield of an automobile, which is able to produce hot water that can be sprinkled on the windshield to melt snow and frost.

(b) Description of the Prior Art

In frigid zones, after an automobile has been left in snowy weather, snow and frost covering the windshield blocks the line of vision in the automobile, and external force must be applied to remove the accumulated snow and frost. Methods for removing the snow and frost include the conventional methods of using an instrument to clear it away or hot water to melt and clean off the snow and frost, thereby avoiding scuffing the glass surface. Hence, in frigid zones, automobiles must be equipped with a device for heating water in preparation for melting snow and frost accumulated on the windshield. In general, the heater device is installed at one end of the windshield wiper water outlet.

Regarding designs of prior art, referring to FIG. 1, which shows a heater 10 of prior art primarily structured with a water vessel 11, front and rear ends of which are provided with an inlet 111 and an outlet 112 respectively. An affinity type heating element 12 is axially installed interior of the vessel 11, and after water enters the vessel 11 through the inlet 111, the water enables a heat exchange function to take effect on a surface of the heating element 12, thereby producing hot water that is output from the outlet 112. The affinity type heating element 12 must be sealed and have the physical property that protects against corrosion. Another heater design of prior art is depicted in FIG. 2, wherein an built-in heating element 14 is disposed interior of a case hole 132 of an exchange element 13. Pipelines 131 are located interior of the exchange element 13 exterior to a border of the case hole 132, which enable exchange of water flow. The built-in heating element 14 is peripherally insulated by means of a plate electrode 141 and assembled interior of the case hole 132, moreover, the built-in heating element 14 is clamped within the case hole 132 by being subjected to an external force. However, because the heating element 14 is the main body for cold and heat operation, thus, material quality of the heating element 14 is easily damaged. Moreover, such a prior art configuration is difficult to repair when it breaks down, and involves a multitude of minor details during the assembly process. Furthermore, the entire structure of the heater 10 must be damaged irreparably in order to repair the heating element 14, including the plate electrode 141. Hence, it is common for the entire single heater 10 to be completely replaced, thereby resulting in meaningless waste and a burden on the environment.

The aforementioned prior art designs are unable to accommodate different power requirements by using a corresponding arrangement of heating elements. Hence, during production, manufacturers must stock a multitude of heaters having different power specifications in order to rapidly supply client needs, thereby increasing inventory cost. Moreover, such prior art designs disallow mass production of standard specifications. Hence, the aforementioned shortcomings increase the total burden on production costs.

SUMMARY OF THE INVENTION

The present invention proposes to advance effectiveness and benefit of an automotive water heater.

Accordingly, a primary objective of the present invention is to use a laminated heating unit face joined to a heat conducting surface of an exchange unit, and the innate physical heat balance property of the heating unit is used to direct transference of heat quantity produced by a heating strip to an exchange bed, thereby similarly achieving good heat transmission efficiency, and providing an automotive water heater that enables direct operation from the exterior of the main body, easy replacement of component members or repairing of the heating strip, and allows for free choice of whether to assemble one set or two sets or a plurality of sets of the heating units.

A second objective of the present invention is to install a buffer layer between the heating unit and a heat conducting surface of the exchange bed.

A third objective of the present invention is to install a buffer device between the heating unit and a sealing back plate heat conducting surface of the exchange bed.

A fourth objective of the present invention is to connect a negative electrode of the heating unit to an exchange unit to avoid tripping of power supply due to factors such as a surge of electric charge of a positive electrode.

A fifth objective of the present invention is to provide the heating unit with a positive temperature coefficient ceramic resistance strip as a heating strip, thereby ensuring stable electrical heating, and hardness of the strips benefit fixedly securing assembly of the configuration.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
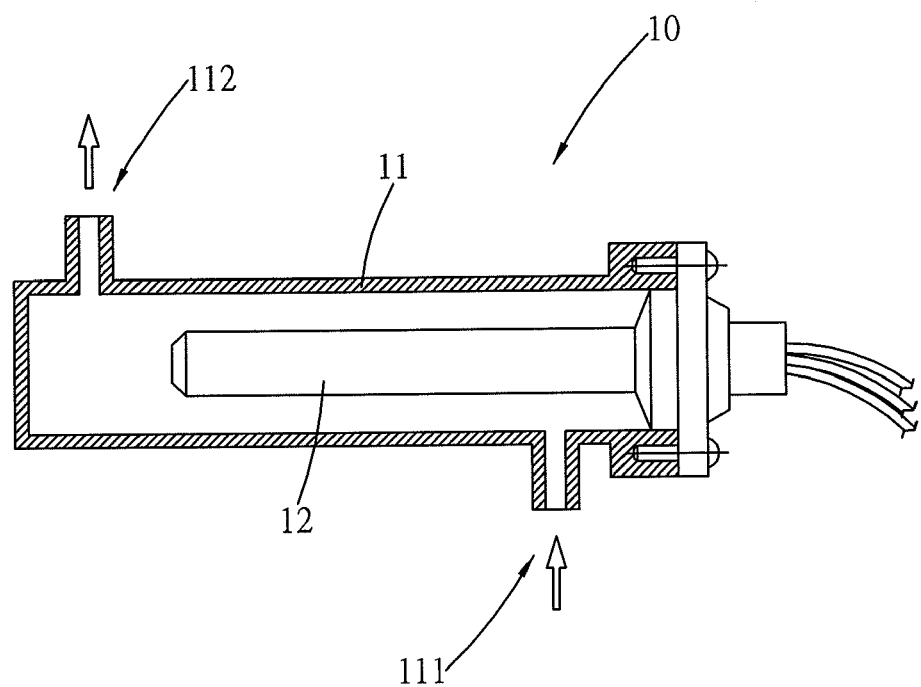
FIG. 1 shows a cross sectional view of an affinity type heater of prior art.
Figure 2:
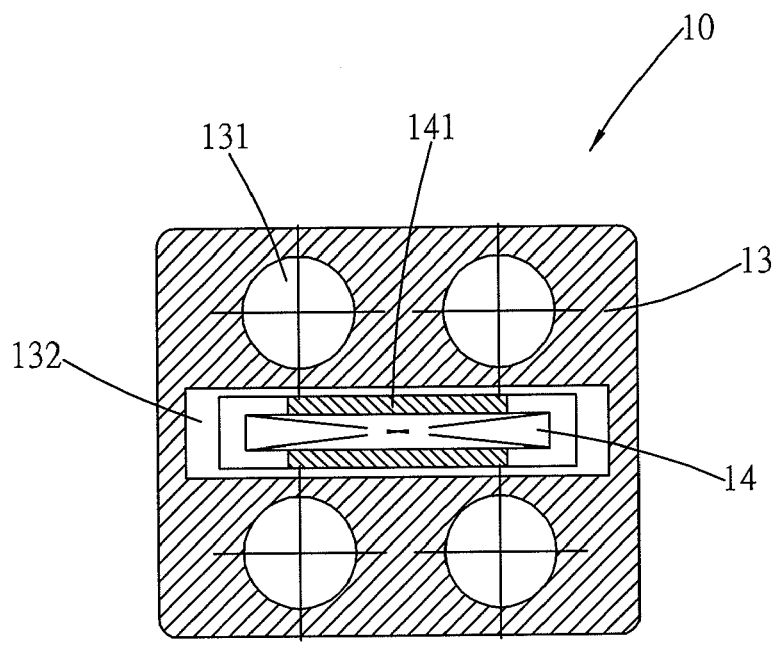
FIG. 2 shows a cross sectional view of a built-in heater of prior art.
Figure 3:
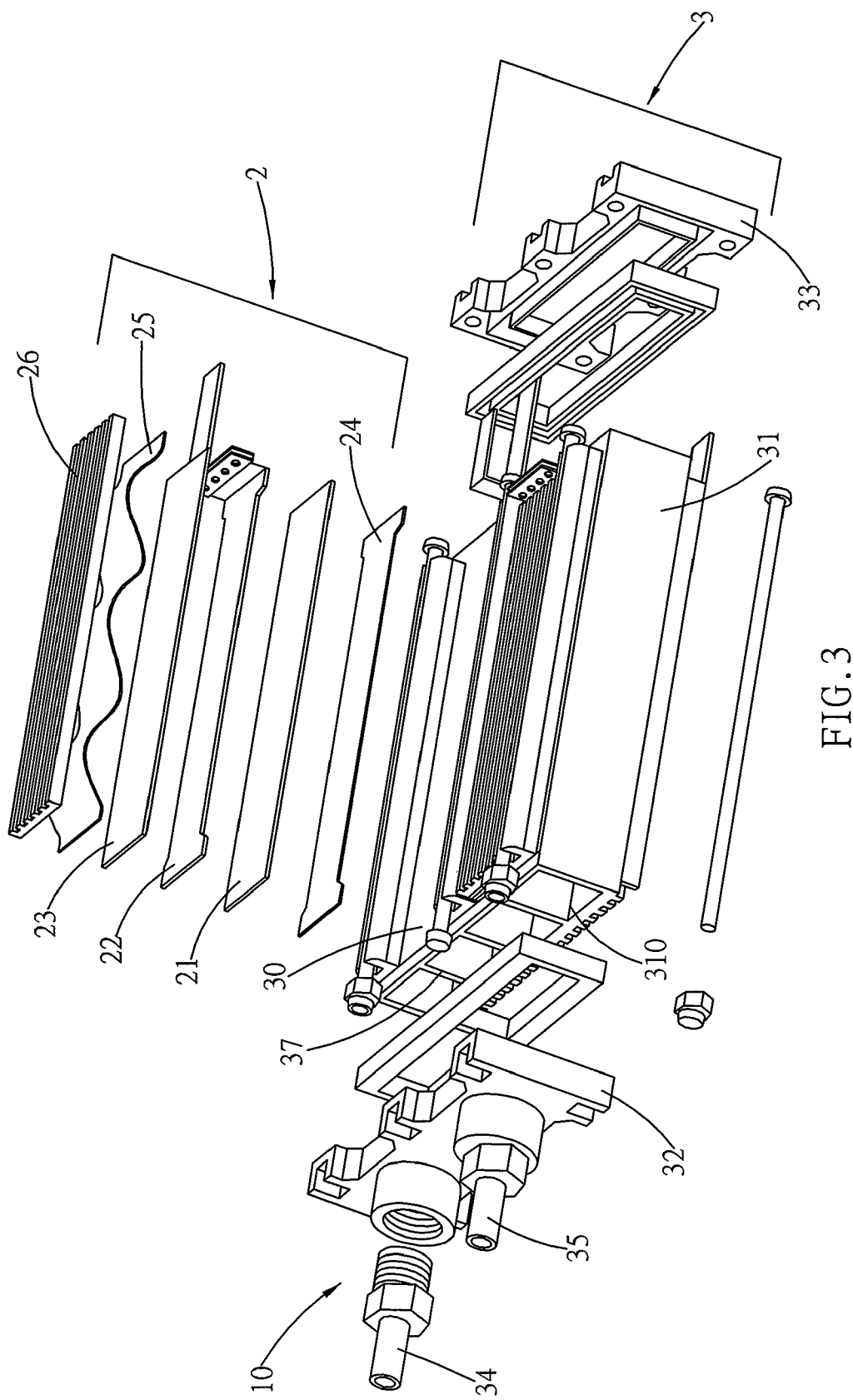
FIG. 3 shows an exploded elevational view depicting assembly relationship of components according to the present invention.

Referring to FIG. 3, which shows a heater 10 of the present invention primarily structured to comprise a laminated heating unit 2 face assembled to a heat exchange unit 3. The heating unit 2 conducts electric power through a heating strip 21 via a plate electrode 22, and an externally controlled switch operates working time. Electrical property of the plate electrode 22 is outwardly separated by an insulating plate 23, which is either provided with a heat conductivity or heat resisting property. In particular, the insulating plate 23 is located to a side of a sealing back plate 26, thereby actualizing a heat resisting property.

The heating strip 21 is fabricated from any electrothermal material, such as electric heating wire or a positive temperature coefficient ceramic resistance strip. The positive temperature coefficient ceramic resistance strip provides a constant temperature and automatic heat regulating function, which together with its intrinsic quality of being a rigid body are used to benefit securing assembly, and thus appropriate to use.

The heating unit 2 is face affixed to a heat conducting surface 30 of an exchange bed 31 of the exchange unit 3. The heat conducting surfaces 30 of the exchange bed 31 are configured to provide a plurality of adjacent or mutually opposite areas, which are located on four outer surfaces of the exchange bed 31. The plurality of areas of the heat conducting surfaces 30 provide a choice of which area to join the heating unit 2 to or a choice of the number of heating units 2 to join thereto.

The externally appearing heat conducting surfaces 30 located on the exchange bed 31 of the exchange unit 3 enable the heating unit 2 to be directly affixedly assembled, which, correspondingly, if the heating unit 2 breaks down, enables unimpeded replacement operation from the exterior, thereby achieving the objective of convenient maintenance as described by the present invention. Moreover, other system mechanisms are not affected during the replacement process, such as flow paths of the heating water. Requirement for high precision joints between components to stop leaks makes it unsuitable for purposeless or repeated dismantling.

The heat conducting surfaces 30 enable the heating units 2 to be respectively assembled thereto, and a lamina buffer layer 24 is disposed between the heating unit 2 and the heat conducting surface 30, wherein insertion of the buffer layer 24 is used to form an assembly interface buffer absorbing space after assembling the heating unit 2.

A buffer device 25 having a relatively large strain range is disposed between the heating unit 2 and the counterpart sealing back plate 26 to clear a distance therebetween. Because of the enlargeable space tolerance of the buffer device 25, thus, the buffer device 25 is able to better assimilate an amount of heat distortion, thereby avoiding mechanical pressure from thermal expansion compressing the heating strip 21. The sealing back plate 26 presses down and exerts force on the heating unit 2 to enable assembling to the exchange bed 31. The aforementioned buffer device 25 can be a spring strip or a plastic body fabricated from silica gel material.

Flow paths 310 that enable water to flow therethrough are defined within the exchange bed 31, and seal end covers 32, 33 are disposed at a front end and a rear end of the flow paths 310 respectively. Pipe orifices 34, 35, which enable water to flow in and out thereof, are located at the seal end cover 32. After water enters the exchange bed 31 through the pipe orifices 34, 35 and flows into the flow paths 310, then heat exchange is carried out with the heat quantity supplied by the heating unit 2, whereafter the heated hot water is output and used to facilitate achieving the objective of the aforementioned application to melt snow and frost on a windshield.

The longitudinal body interior of the aforementioned exchange bed 31 is provided with the plurality of adjacent and parallel flow paths 310 spaced at intervals by a plurality of ribbed plates 37, and two adjacent flow paths 310 are sleeve joined through end surfaces of the seal end covers 32 or 33. indented spaces of the seal end covers 32 or 33 define inflow and turnaround areas for two adjacent flow paths 310. Accordingly, during the process of water entering and exiting the pipe orifices 34, 35 located at the front seal end cover 32, a S-shaped heated water stream in the plurality of flow paths 310 is formed through cooperation between the seal end covers 32, 33 forming a S-shaped path.

Please refer to FIG. 3-A in regard to a more detailed description of the formation of the S-shaped stream, wherein the parallel spacing of the plurality of ribbed plates 37 longitudinally located in the interior of the exchange bed 31 enables forming the plurality of mutually parallel flow paths 310, and each end opening of two adjacent flow paths 310 is covered by the front and rear seal end covers 32, 33, in which each of the seal end covers 32, 33 are adapted to match the required positions for the turnaround of adjacent stream currents, and indentations define turnaround areas 320, 330. Accordingly, after water enters the water inlet pipe orifice 34, then an S-shaped turnaround stream is formed in each of the flow paths 310, thereby enabling the full potential of the transported heat energy in each flow path to be retrieved.

The buffer layer 24 provides a mechanical deformation buffer function, and is basically also able to realize an electrical conducting or non-conducting function. Referring to FIG. 3, wherein the plate electrode 22 leads electric power from a positive electrode to the heating strip 21, which is then led to the exchange bed 31 by means of a negative electrode through conduction of the buffer layer 24. The exchange bed 31 outwardly connects to a negative electrode of an automobile system, thereby enabling current to flow to the heating strip 21 through the plate electrode 22. The negative electrode circuit thus indirectly electrically conducts negative electricity from the car body to the exchange bed 31 through the buffer layer 24. Because electric polarity of the entire automobile is negative, which is seen as having enormous capacitance because of the large size of the automobile, thus, the negative electricity is completely delivered to the car body through the exchange bed 31, without producing a resident electric charge, thereby avoiding the danger of high electric charge occurring under circumstances where a power surge is generated or power is unstable.

The insulating plate 23 is any plate member having insulating function, such as a mineral plate, wherein aluminum oxide is the preferred mineral for the mineral plate.

Referring again to FIG. 4, which shows the heater 10, wherein a number of the laminated heating units 2 are face assembled to a surface of the exchange bed 31 of the exchange unit 3, and the pipe orifices 34 and 35 provide for water to flow therein. An airtight solid joint must be made between the heating units 2 and the exchange bed 31, and gluing or external mechanical press fitting can be adopted as the method to realize the joint. The external mechanical press fitting method can be realized by using mechanical strength of the sealing back plates 26 and a compression plate 4 to form a compression joint, wherein the compression plate 4 is screwed down to the exchange bed 31 using general screws 41, and force of the compression joint is transmitted to the sealing back plates 26, thereby compressing the sealing back plates 26 and enabling the laminated heating units 2 to be firmly joined to corresponding positions of the exchange bed 31.

According to the aforementioned configuration, the sealing back plates 26 can be dismantled by detaching the compression plate 4, thereby enabling replacing component members interior of the heating units 2, in particular, the aforementioned heating strips 21.

The compression plate 4 is correspondingly locked to the exchange bed 31 using the screws 41, and sides of the compression plate 4 are able to compress corresponding sides of the sealing back plates 26, thereby pushing back the compression plates 4 and relieving each detailed component of the heating unit 2 to assure achieving the objective of enabling maintenance from the exterior.

The face-to-face assembly method adopted in the present invention provides a choice of whether to assemble one set or two sets or a plurality of sets of the heating units 2. If power of each of the heating units 2 is fixed, then total power of more than two of the heating units 2 is additive, which enables accommodating production of different power requirements, wherein the individual heating units 2 and exchange beds 31 are regarded as standard components which facilitates mass production thereof. Different numbers of the heating units 2 can be assembled according to power requirements, thereby accommodating clients who wish to purchase heaters having different power requirements within the same batch, and benefiting mass production.

Figure 5:
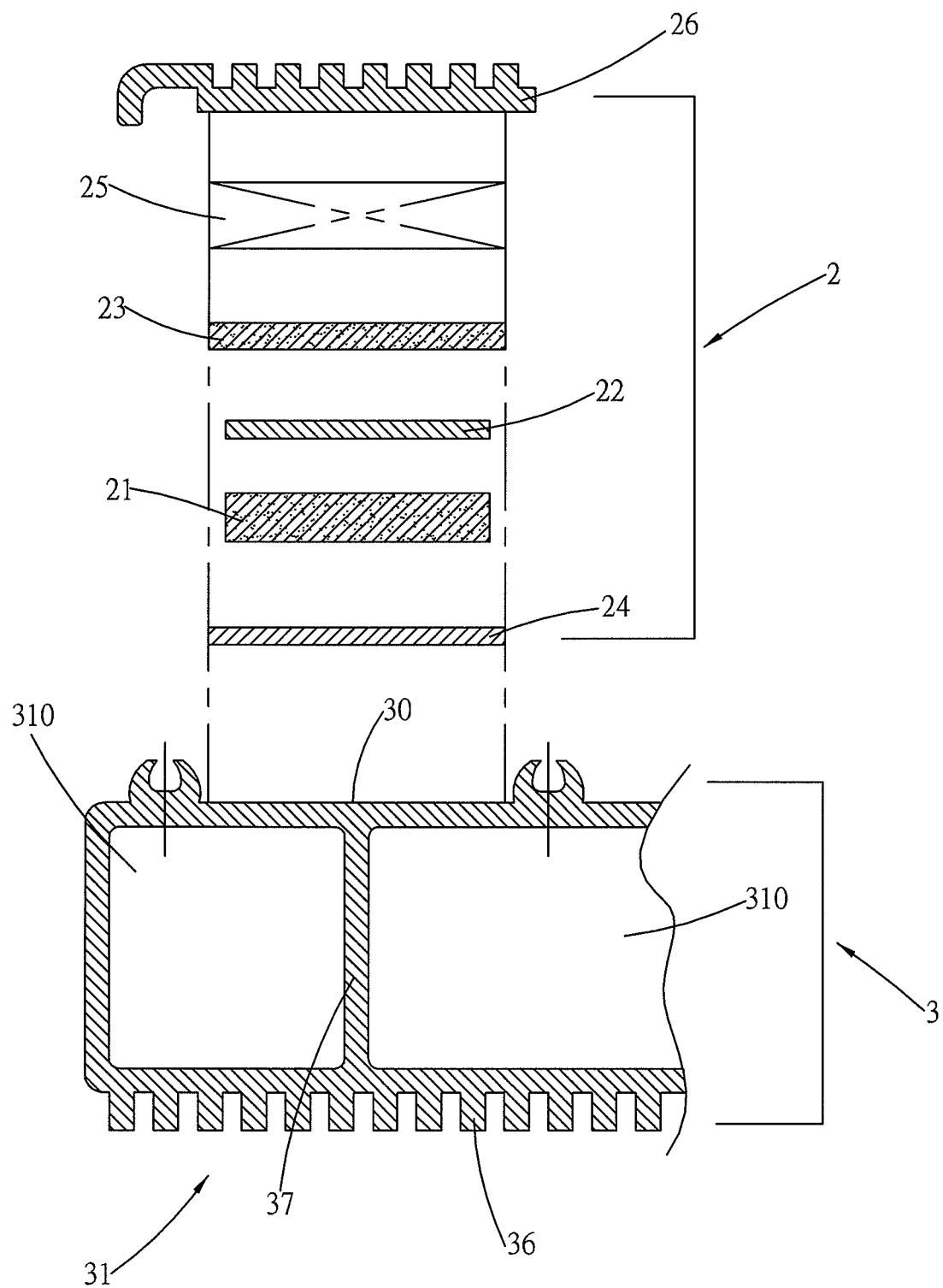
FIG. 5 shows a schematic view of a heating unit negative electrode connected to an exchange bed according to the present invention.

Referring to FIG. 5, the heating unit 2 is a laminated assembly of a plurality of component members, and the entire body of the assembled heating unit 2 is face joined to the heat conducting surface 30 of the exchange bed 31. An outer side of the heating strip 21 forms an electrical conducting circuit through the plate electrode 22. After insulation of the plate electrode 22 via the insulating plate 23, then a periphery of the heating unit 2 is enclosed with the sealing back plate 26. An inner side of the buffer layer 24 having electric conduction property is joined to the heat conducting surface 30, and the exchange bed 31 is connected to the negative electrode of an automobile system. Accordingly, electric power enters the heating strip 21 through the plate electrode 22 and electrically heats the heating strip 21, whereupon a negative electrical circuit is realized through electrical conduction with the exchange bed 31 via the buffer layer 24 and indirect connection to the negative electrode of the automobile.

The water flow paths 310 are defined interior of the exchange bed 31, and the water flow paths 310 pass interior of corresponding positions of the heat conducting surfaces 30, thereby enabling exchange of heat quantity produced by the heating strips 21 with water flowing through the flow paths 310 and carrying away of the heated water. Heat waves generated by the heating strip 21 are three-dimensionally outward transmitted, however, because matter has a heat balance function, and a side of the corresponding heat conducting surface 30 forms a heat sink and a temperature drop, hence, the physical function of heat balance causes the heat quantity close to a corresponding side of the plate electrode 22 to replenish the heat at the side of the heat conducting surface 30, thereby enabling the entire heat quantity generated by the heating strip 21 to be in complete contact with the exchange bed 31.

Figure 3A:
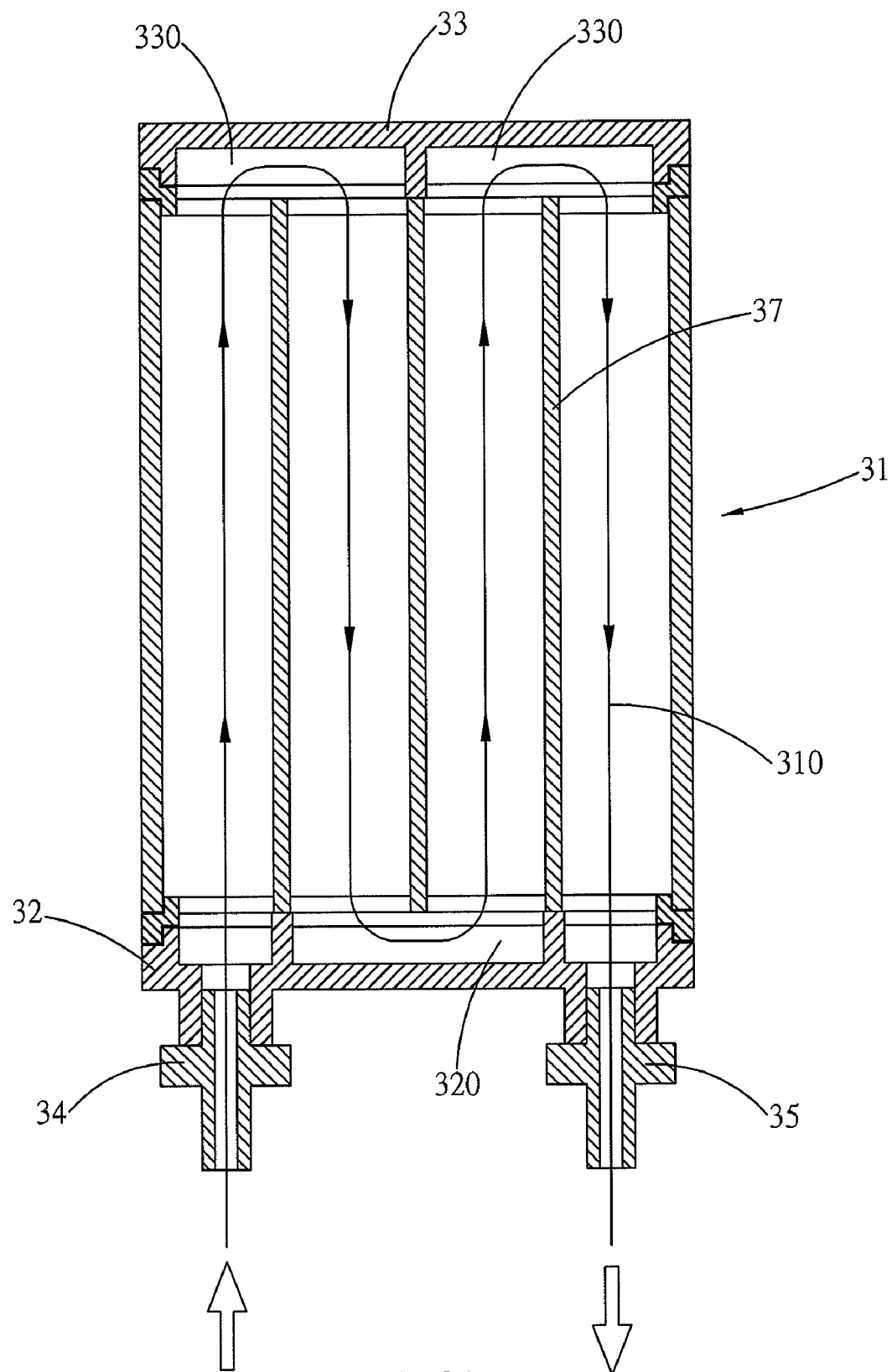
FIG. 3A is a top view depicting formation of flow paths according to the present invention.

The flow paths 310 provided by the exchange bed 31 are turnaround streams, and the formation of the turnaround streams has been related in detail in the description of FIG. 3A, in which the flow paths 310 are primarily formed during the process of molding the exchange bed 31, whereby an integral combined body having the ribbed plates 37 located in the longitudinal interior of the exchange bed 31 is formed. The ribbed plates 37 are located at positions corresponding to inner sides of the heat conducting surfaces 30, thereby enabling forming a direct heat conducting function which rapidly conducts heat quantity to the interior of the exchange bed 31.

Mechanically strengthening rib strips 36 are located on an outer side of the exchange bed 31, thereby mechanically strengthening an outer periphery of the exchange bed 31. Although existence of the strengthening rib strips 36 enlarges heat dissipating surface area, however, any enveloping heat resistance method can be implemented on a periphery of the exchange unit 3 to limit heat energy to within the single exchange bed 31.

Figure 4:
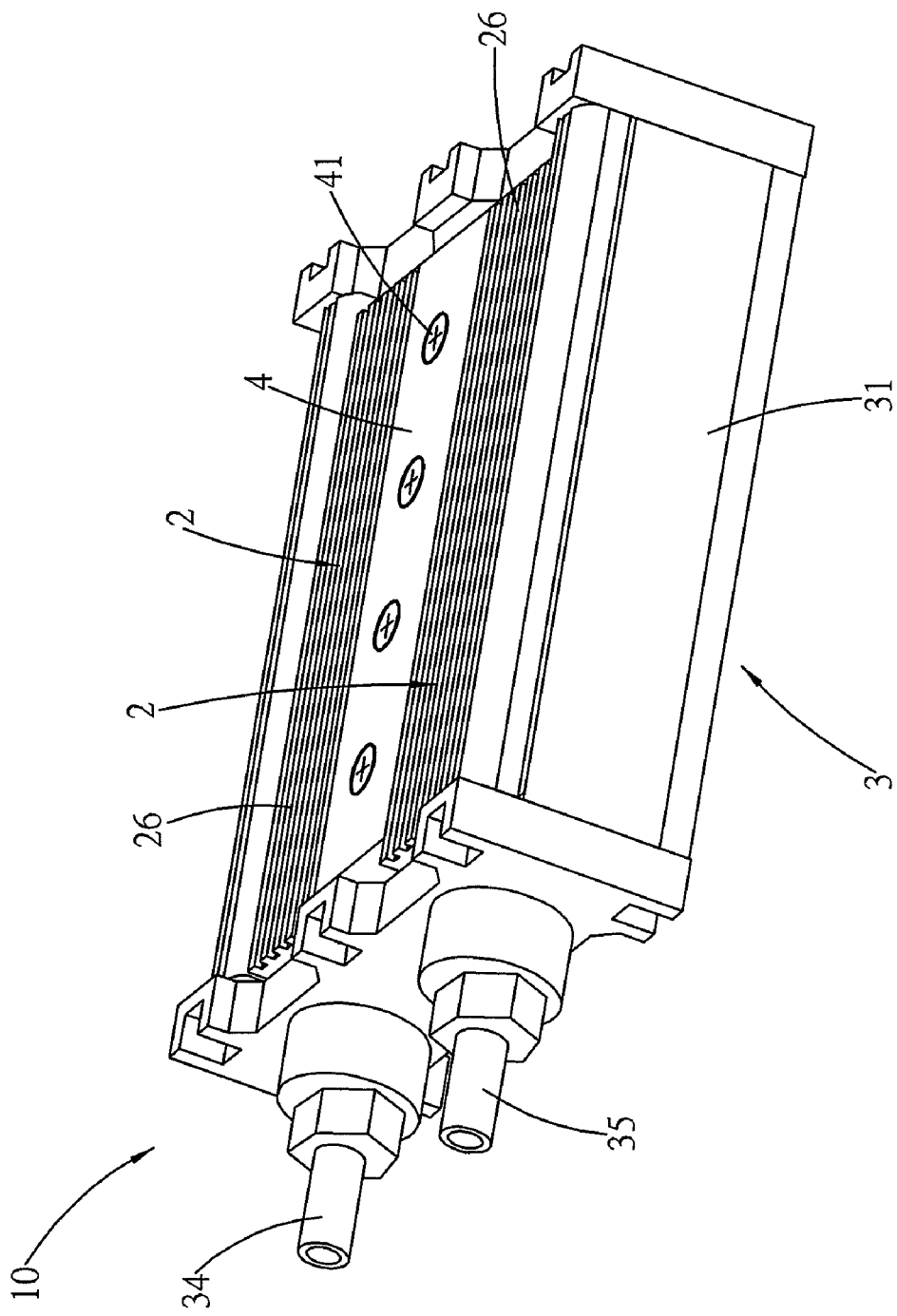
FIG. 4 shows an elevational view depicting completed assembly of FIG. 3.

Apart from the fixing method used to join the sealing back plates 26 to the exchange bed 31, as depicted in FIG. 4, any clasp connection or pin connection or joggle connection or adhering connection can also be adopted to use mechanical force of the sealing back plates 26 to join the heating units 2 to the exchange bed 31, and thereby realize mechanical stabilizing assembly of the heating units 2, wherein the buffer devices 25 are similarly respectively interposed between the sealing back plate 26 and the heating unit 2 (see FIG. 3).

Figure 6:
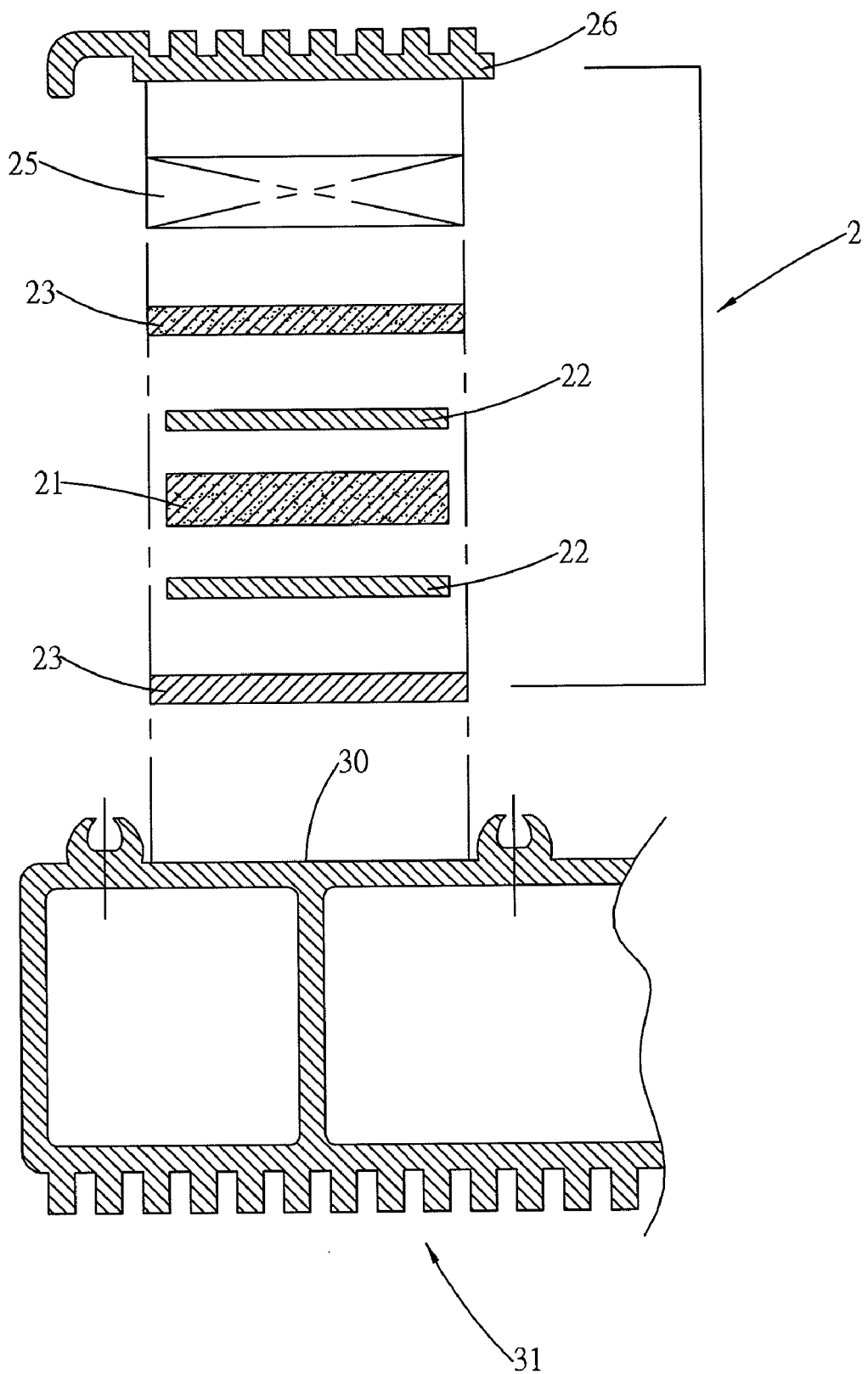
FIG. 6 shows a schematic view of positive and negative electrodes conductively connected to the heating strip and correspondingly connected to the exchange bed according to the present invention.

Referring again to FIG. 6, the heat conducting surface 30 of the exchange bed 31 enables joining the laminated heating unit 2 thereto, and the buffer device 25 is similarly disposed between the laminated heating unit 2 and the sealing back plate 26.

The heating unit 2 is upper and lower joined to electrodes through the heating strip 21, wherein the heat conducting surface 30 is separately joined to the plate electrode 22, and the plate electrode 22 is outwardly separately joined to the insulating plate 23. Accordingly, electric power primarily flows through the heating strip 21 by means of the two plate electrodes 22, thereby electrically heating the heating strip 21. Hence, related electric property is primarily conducted by means of the two opposite plate electrodes 22, and has no relation to the exchange bed 31. Such an embodiment can be implemented in a situation of relatively low voltage or where circuit design of the automobile is limited. The insulating plate 23 is similarly interposed between the heating unit 2 and the exchange bed 31. Moreover, the insulating plate 23 is fabricated from mineral material such as aluminum oxide, thereby providing the insulating plate 23 with heat conducting property.

Figure 7:
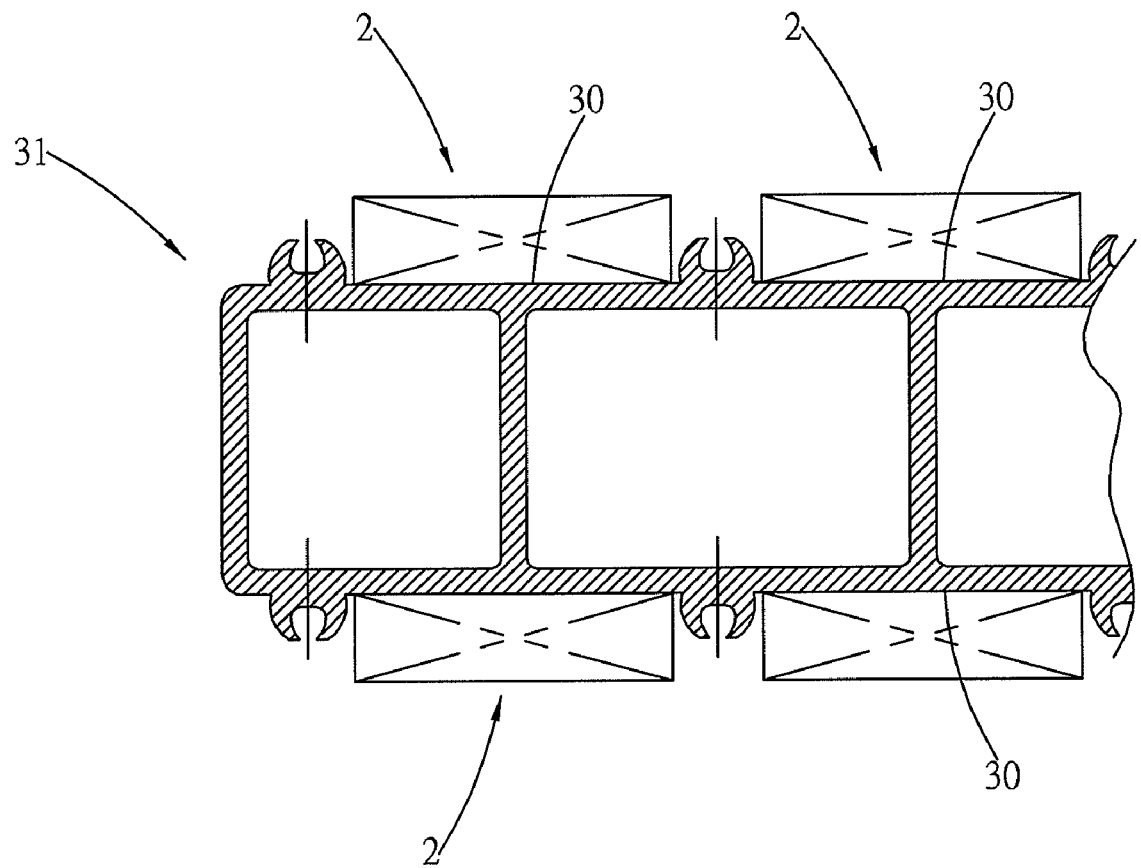
FIG. 7 shows a schematic view depicting positional relationship of a plurality of sets of the heating units assembled on the exchange bed according to the present invention.

Referring to FIG. 7, wherein the exchange bed 31 configured with the heat conducting surfaces 30 enables the heating units 2 to be face joined thereto. The heat conducting surfaces 30 are designed with a plurality of areas to provide the choice to assemble and join more than one set of the heating units 2 to the exchange bed 31, thereby accommodating different power size requirements. Basically, each of the outer sides of the exchange bed 31 can be designed with heat conducting surfaces to enable the heating units 2 to be butt jointed to front and rear surfaces of the exchange bed 31 and form a mutually corresponding state or are juxtaposed adjacent to each other, thereby accommodating different power requirements according to the number of heating units 2 assembled. Accordingly, standardized mass production of the single heating unit 2 can be put into effect, and because the exchange bed 31 is of standard specifications, thus, mass production of all component members having standard specifications effectively increases production capacity. Hence, the number of heating units 2 to be assembled can be chosen in order to accommodate different power requirements, thereby achieving the objective of coping with modification, which benefits production line stock inventory and flexibility to accommodate different power requirements, thereby improving production efficiency and reducing inventory cost.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An automotive water heater, applying to a windshield of an automobile, and producing hot water that is sprinkled on the windshield to melt snow and frost, comprising:
   at least one laminated heating unit, the heating unit conducts electric power through a heating strip clamp connected to a plate electrode, an exterior of the plate electrode is joined to an insulating plate;
   a sealing back plate, the sealing back plate is joined to an exterior of the insulating plate;
   an exchange bed, the surface of the exchange bed is fitted with a plurality of adjacent and parallel heat conducting surfaces, the interior is composed of a plurality of longitudinal parallel ribbed plates joined as an integral body separating out a plurality of adjacent and parallel flow paths;
   a seal end cover, the seal end cover seals end surfaces of the flow paths established in the exchange bed, the seal end cover is provided with entrance-exit pipe orifices enabling the entrance and exit of water to the exchange bed, a space is gouged out of the sleeve connected position at the end surface of two related flow paths in an internal breadth of the seal end cover by an indentation to form a turnaround area for the two adjacent flow paths to flow into;
   another seal end cover, the seal end cover seals another end surface of the exchange bed to form an end surface sleeve connection, a space is gouged out of the sleeve connected position at the end surface of two related flow paths in an internal breadth of the seal end cover by an indentation to form a turnaround area for the two adjacent flow paths to flow into.

2. The automotive water heater according to claim 1, wherein thin buffer layers are provided between the laminated heating units and the facing surfaces of the heat conducting surfaces.

3. The automotive water heater according to claim 1, wherein buffer devices are indirectly fitted between the sealing back plates and the laminated heating units.

4. The automotive water heater according to claim 1, wherein the sealing back plates are subjected to pressure from a compression plate, and the compression plate is further screwed and joined to the exchange bed screws.

5. The automotive water heater according to claim 1, wherein the plurality of heat conducting surfaces are distributed on the exterior of four sides of the exterior of the exchange bed.

6. The automotive water heater according to claim 1, wherein the laminated heating units are configured in a mutually facing state and joined to two mutually facing surfaces of the exchange bed.

7. The automotive water heater according to claim 1, wherein the sealing back plate presses the exterior of the laminated heating unit through the buffer device, and the produced pressure compresses the inner surface of the laminated heating unit to tightly press the heat conducting surfaces.

* * * * *